United States Patent [19]

Hewlett

[11] Patent Number: 4,587,836
[45] Date of Patent: May 13, 1986

[54] TEST STAND FOR A VALVE

[75] Inventor: Kelvin J. R. Hewlett, Market Harborough, United Kingdom

[73] Assignee: Crosby Valve & Engineering Company Limited, Leicestershire, United Kingdom

[21] Appl. No.: 657,001

[22] Filed: Oct. 2, 1984

[51] Int. Cl.$^4$ .............................................. G01M 3/28
[52] U.S. Cl. .......................................... 73/49.8; 73/46
[58] Field of Search .................................... 73/49.8, 46

[56]  References Cited

U.S. PATENT DOCUMENTS

| | | | |
|---|---|---|---|
| 1,373,824 | 4/1921 | McKenzie | 73/46 |
| 1,571,958 | 2/1926 | Mueller et al. | 73/46 |
| 3,131,558 | 5/1964 | Davis | 73/49.8 |
| 3,163,035 | 12/1964 | Kinzie et al. | 73/49.8 |
| 3,169,391 | 2/1965 | Spalding | 73/49.8 |
| 4,311,038 | 1/1982 | Dunn | 73/49.8 |
| 4,432,227 | 2/1984 | Dunn | 73/49.8 |

Primary Examiner—Stewart J. Levy
Assistant Examiner—Hezron E. Williams
Attorney, Agent, or Firm—Mason, Kolehmainen, Rathburn & Wyss

[57] ABSTRACT

There is disclosed a test stand for the pressure testing of a valve which comprises a flat support table defining a valve testing station onto which a port of a valve can be placed, means provided in the support for directing fluid pressure medium into the port when the valve is placed on the support table, and a set of jaws uniformly spaced around the testing station and mounted for slidable movement in unison along respective radial guides between a release position in which a valve can be placed on, or removed from, the support table, and a holding position in which the jaws engage with the valve, or a part connected to the valve, in order to centralize the valve between the jaws on the testing station. The jaws are power operated, under the action of fluid pressure medium supplied to operating cylinders coupled with the jaws, so that the jaws can move downwardly towards the support table in order to hold-down the valve in position on the support table (after the jaws have been moved from the release position to the holding position) prior to pressure testing of the valve. The test stand may be provided with one, two or three testing stations.

14 Claims, 10 Drawing Figures

TABLE A (FITTED WITH INTEGRAL RELIEF VALVE SET TO 325 P.S.I. MAX.)

| SIZE | MAX. PRESSURE | ANSI B16-5 RF. FLANGE DIAS. | | | | | |
|---|---|---|---|---|---|---|---|
| | P.S.I. | 150 | 300 | 600 | 900 | 1500 | 2500 |
| 8" | 300 | – | – | 16 1/2" | – | – | – |
| 10" | 300 | 16" | 17 1/2" | – | – | – | – |
| 12" | 300 | 19" | 20 1/2" | – | – | – | – |
| 14" | 300 | 21" | 23" | – | – | – | – |

TABLE B (MAXIMUM WORKING PRESSURE 10 000 P.S.I.)

| SIZE | MAX. PRESSURE | ANSI B16-5 RF. FLANGE DIAS. | | | | | |
|---|---|---|---|---|---|---|---|
| | P.S.I. | 150 | 300 | 600 | 900 | 1500 | 2500 |
| 1 1/2" | 10 500 | – | – | – | – | – | 8" |
| 2" | 10 500 | – | – | – | 8 1/2" | 8 1/2" | 9 1/4" |
| 2 1/2" | 5 000 | – | – | – | 9 5/8" | 9 5/8" | 10 1/2" |
| 3" | 5 000 | – | 8 1/4" | 8 1/4" | 9 1/2" | 10 1/2" | 12" |
| 4" | 3 200 | 9" | 10" | 10 3/4" | 11 1/2" | 12 1/4" | – |
| 6" | 1 500 | 11" | 12 1/2" | 14" | 15" | 15 1/2" | – |
| 8" | 950 | 13 1/2" | 15" | – | – | – | – |

TABLE C (MAXIMUM WORKING PRESSURE 10 000 P.S.I.)

| SIZE | MAX. PRESSURE | ANSI B16-5 RF. FLANGE DIAS. | | | | | |
|---|---|---|---|---|---|---|---|
| | P.S.I. | 150 | 300 | 600 | 900 | 1500 | 2500 |
| 1/2" | 10 500 | 3 1/2" | 3 3/4" | 3 3/4" | 4 3/4" | 4 3/4" | 5 1/4" |
| 3/4" | 10 500 | 3 7/8" | 4 5/8" | 4 5/8" | 5 1/8" | 5 1/8" | 5 1/2" |
| 1" | 10 000 | 4 1/4" | 4 7/8" | 4 7/8" | 5 7/8" | 5 7/8" | 6 1/4" |
| 1 1/2" | 5 800 | 5" | 6 1/8" | 6 1/8" | 7" | 7" | – |
| 2" | 3 000 | 6" | 6 1/2" | 6 1/2" | – | – | – |
| 2 1/2" | 2 000 | 7" | 7 1/2" | 7 1/2" | – | – | – |
| 3" | 1 560 | 7 1/2" | – | – | – | – | – |

TABLE CLAMPS

| | TABLE A | TABLE B | TABLE C |
|---|---|---|---|
| N° OF CLAMPS | 3 | 3 | 2 |
| TOTAL MAX. THRUST | 60 420 lbs | 60 420 lbs | 15 000 lbs |
| MIN. CLAMP DIA. | 7 1/2" | 8" | 3 1/2" |
| MAX. CLAMP DIA. | 15 5/8" | 15 1/2" | 23" |
| MIN CLAMP HT TO TABLE | 1 1/2" | 1 1/2" | 5/8" |
| MAX. CLAMP HT TO TABLE | 3 11/16" | 3 11/16" | 2 1/4" |
| USABLE THRUST (20% SAFETY) | 48 300 lbs | 48 300 lbs | 12 000 lbs |

TEST STAND FOR A VALVE

This invention relates to a test stand for the pressure testing of a valve.

During the manufacture of valves, and especially high pressure valves and pressure relief valves, it is essential for the valves to be tested for satisfactory operation before despatch to a customer. Also, testing may be necessary following repair or replacement of worn parts. Existing test stands have a flat support on which a port of the valve is placed, e.g. an intake port or an outlet port, and which has a pressure outlet via which test fluid under pressure can be conveyed to the interior of the valve via its port. In order to hold down the valve on the flat support, it is usual to provide generally "mechanical", manually operated holding arrangements e.g. bolt-down type arrangements.

The existing arrangements are particularly time-consuming both to set-up prior to testing, and also during subsequent dismantling. Thus, it is necessary for an operative to manipulate manually the valve into the correct testing position on the support, to insert gaskets or other seals in position and then to carry out any necessary adjustment (where necessary to suit the size of the particular valve concerned), and then tighten the hold-down arrangement.

Accordingly, there does exist a need generally to "automate" the operation of existing test stands for pressure testing of valves, so as to be able to operate automatically in order to centre a valve in the required position over a pressure test outlet, and then to clamp the valve firmly in this position.

According to one aspect the invention provides a test stand for the pressure testing of a valve which comprises a flat support defining a valve testing station onto which a port of a valve can be placed, means provided in said support for directing test fluid pressure medium into said port when the valve is placed on the support, and jaws slideably mounted on the support for movement inwardly and outwardly relative to the testing station between a release position in which a valve can be placed on, and removed from, the support and a holding position in which the jaws engage with the valve, or a part connected to the valve, in order to position the valve on the support:

in which the jaws are also moveable, when in the holding position, in a direction towards the support so as to hold-down the valve on the support prior to pressure-testing of the valve.

According to a second aspect the invention provides a test stand for the pressure testing of a valve which comprises a flat support defining a valve testing station onto which a port of a valve can be placed, means provided in said support for directing test fluid pressure medium into said port when the valve is placed on the support, and power-operated jaws mounted on the support around the testing station for movement towards the support so as to hold-down the valve on the support prior to pressure-testing of the valve.

According to a third aspect the invention provides a test stand for the pressure testing of a valve which comprises a flat support defining a valve testing station onto which a port of a valve can be placed, means provided in said support for directing fluid pressure medium into said port when the valve is placed on the support, and a set of jaws uniformly spaced around the testing station and mounted for slideable movement in unison along respective radial guides between a release position in which a valve can be placed on, or removed from, the support, and a holding position in which the jaws engage with the valve, or a part connected to the valve, in order to centralise the valve between the jaws on the testing station:

in which the jaws are power operated for movement, when in the holding position, towards the support in order to hold-down the valve in position on the support prior to pressure testing of the valve.

Conveniently, the flat support comprises a table which is mounted on a base plate by means of a pedestal which is rigidly mounted on the base plate.

Further, if desired, the base plate is provided with more than one test stand, for example two or three, each mounted on the base plate by means of a respective pedestal. It is preferred that each test stand is designed to enable testing of a particular size of valve, or for testing a particular range of pressures. Conveniently, the table and related parts of each stand are interchangeable.

The pedestal of each stand may serve to convey the test fluid pressure medium e.g. compressed air or hydrostatic pressure, and is therefore provided with a suitable fluid medium input, and a passage leading to a fluid medium outlet provided in the support (table). The pedestal may also serve to convey a supply of fluid energy to operate the jaws.

The jaws are preferably spring-loaded in a direction away from the table (usually upwardly away from the table), and have operating cylinders connected to the supply of fluid energy in the pedestal so as to move the jaws towards the table against the spring loading in the hold-down mode of the jaws. By this means, all of the jaws are operated simultaneously, thereby ensuring firm, substantially leak-proof seating of the valve on the table. This represents a distinct technical improvement over known bolt-down arrangements, in which great care has to be taken in the manner by which individual bolts, nuts and the like are tightened up so as to advance, as far as possible, the contact face of the valve towards the support on which it is to be tested in a manner whereby the plane of the contact face and that of the support are maintained substantially parallel to each other during this advancement. Evidently, undue tightening of one bolt may cause an edge of the contact face of the valve to tend to "dig-in" into the surface of the support, and subsequent proper seating of the contact face, by tightening of the other bolts, becomes very difficult. When high pressures are involved, this is a very serious drawback of the existing arrangements.

In addition, it is preferred that the test stand according to the invention is provided with a manually operated level arrangement to move the jaws in unison along their respective guides for the purposes of centering the valve between the ends of the jaws. Operation of the lever (with the jaws in the release position) causes the jaws to advance simultaneously towards the valve e.g. towards an annular flange surrounding the intake port of the valve, and any mispositioning of the valve is automatically adjusted as the jaws come into engagement with the annular flange and centre the valve between the jaws. This ensures that correct positioning of the valve takes place over a fluid test medium outlet provided in the table on which the valve is placed.

The test stand according to the invention may be used in the pressure testing of many different types of valve, but is especially suitable for high pressure testing of pressure relief valves. The test stand may also be used as an assembly stand during manufacture of a valve, in that initially a main valve housing can be clamped in position on the table, the assembly can then be completed on the clamped valve housing, pressure testing carried out, and then the assembled and tested valve can be unclamped ready for despatch to a customer.

A test stand according to the invention is particularly suitable for clamping in position the flanged end of a valve, in which case the jaws have head portions which project generally inwardly towards the testing station and which serve to engage, and press downwardly upon the flat upper surface of the annular flange. However, the test stand may be readily modified, by appropriate shaping of the jaws, so as to be able to centre, and hold down, other types of valve so that any required port, e.g. the inlet port, can receive test fluid pressure medium from the table. For example, screwed male or female valves, e.g. safety relief valves, may be tested on the test stand according to the invention, by provision of an adapter flange which is first mounted in position, and held down, on the table by the jaws, and then receives the screwed end of the valve concerned. The adapter flange may be suitably arranged to receive male or female screwed ends.

If desired, a pressure boost system may be built-in to the test-stand, when pressure testing is required to be carried out at pressures greater than the supply pressure which is available.

Embodiments of test stand according to the invention for the pressure testing of a valve will now be described in detail, by way of example only, with reference to the accompanying drawings in which.

Referring now to the drawings, there is shown a three pedestal test stand for the pressure testing of a valve and comprising a base plate 10 supported on a floor by transverse beams 11. Pedestals 12, 13 and 14 are mounted on the base plate 10, preferably interchangeably, and each comprise a support table 15 which forms a testing station on which a valve to be tested can be placed.

Figure 2:
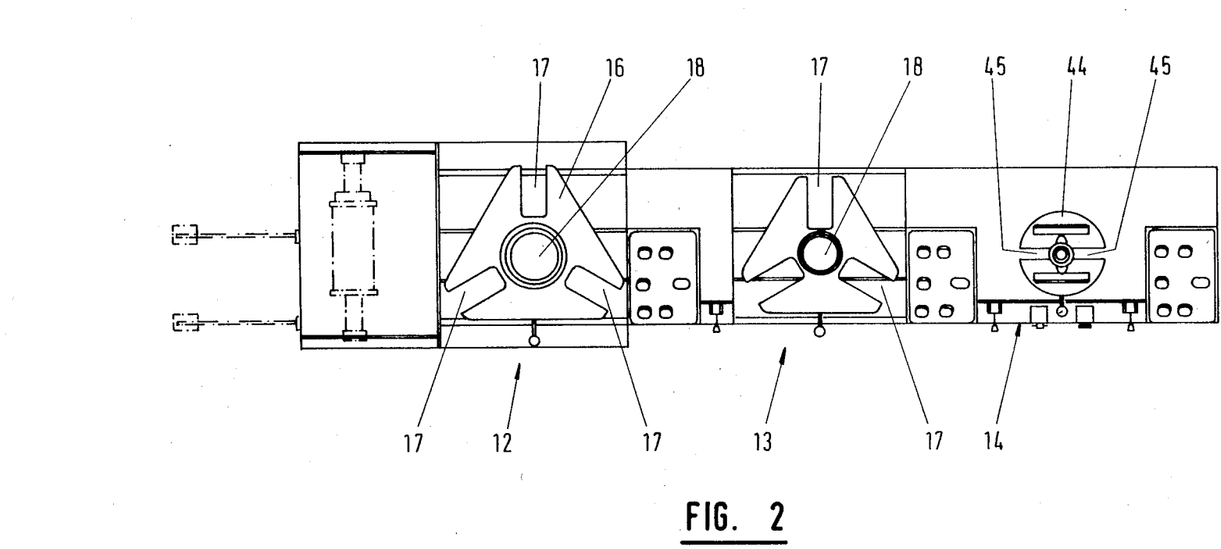
FIG. 2 is a plan view of the test stand shown in FIG. 1.

Referring now to FIG. 2, the test stand is shown in plan view, and it will be noted that the support tables 15 of the pedestals 12 and 13 are of generally similar construction. Thus, pedestal 12 comprises a generally triangular support plate 16 which is formed with three radially inwardly extending guides 17 (having a purpose which will be described below), and a circular, central portion 18 onto which a valve can be placed. The central portion 18 forms a valve testing station onto which a valve can be placed, and is provided with an outlet (not shown in FIG. 2) from which test fluid pressure medium can be directed into a port of a valve placed on the plate 16. The construction of the support plate at pedestal 13 is generally similar to that provided at pedestal 12, though it will be noted that central portion 18 is smaller, and the guides 17 project radially inwardly by a greater extent.

Figure 4:
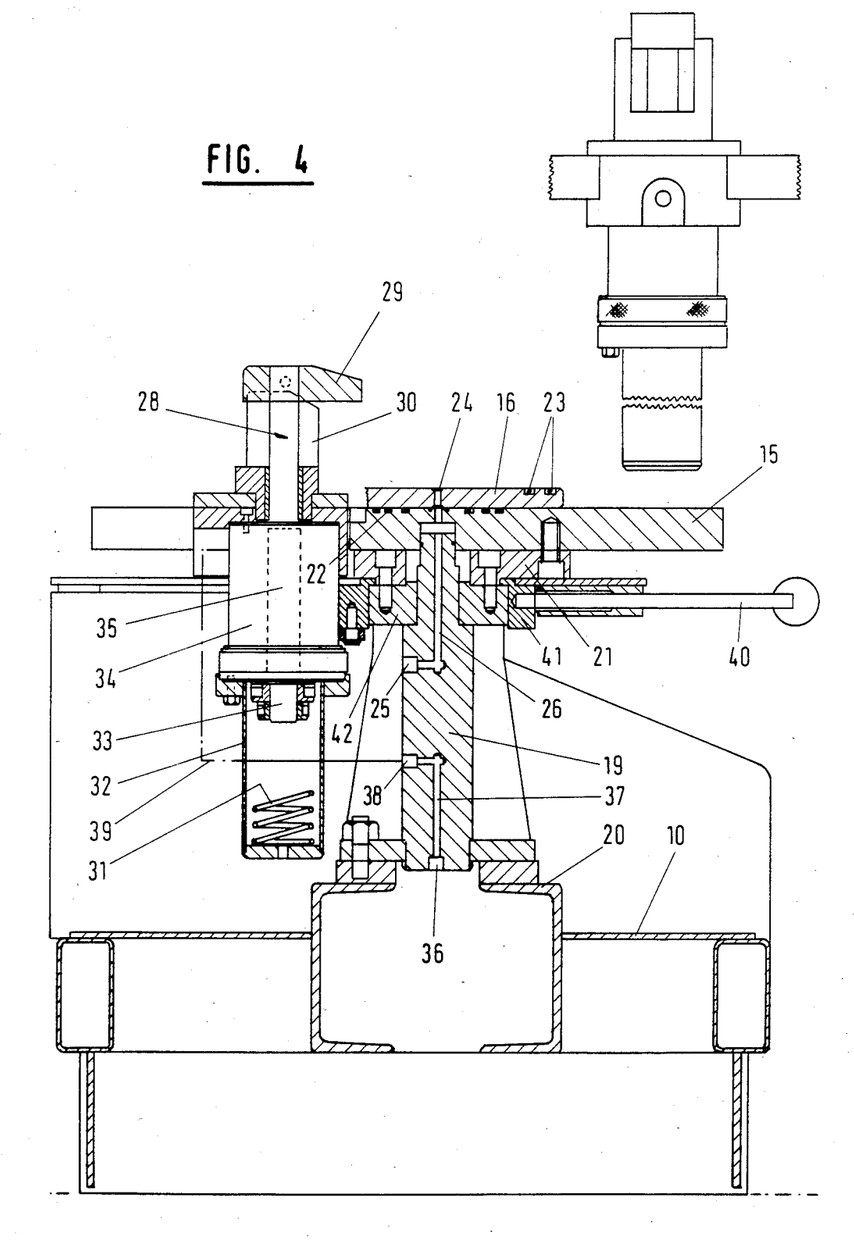
FIG. 4 is a vertical sectional view of the support table shown in FIG. 3.

The construction of a support table and plate 16 will be described in more detail with reference to FIG. 4, which is vertical sectional view illustrating in more detail the construction of a typical pedestal and support table. The pedestal comprises an upstanding support 19 which is mounted rigidly on base plate 10 on a hollow longitudinal beam 20 built into the base of the test stand. The support 19 has table 15 rigidly secured thereto, by means of an intermediate member 21 which is bolted to a fixed annular portion 42 of the support 19, the table 15 being bolted to member 21. Support plate 16 is mounted on table 15, and a concentric arrangement of O-rings 22 seal the interface between table 15 and support plate 16, and a concentric arrangement of O-rings 23 is provided in the facing surface of plate 16 onto which a valve is to be placed. A test fluid pressure outlet 24 is provided centrally of the support plate 16, and serves to direct fluid medium into a port of a valve which is placed on the plate 16. Fluid medium is conveyed to the outlet 24 by way of an inlet 25 provided in support 19 and a vertically extending passage 26 which extends upwardly from inlet 26 within support 19, through the table 15 and through plate 16 to the outlet 24.

In order to centre, and to hold down, a port of a valve on support plate 16, an arrangement of jaws is provided around the testing station, the jaws being moveable between a release position in which the valve can be placed on, and removed from, the support plate 16, and a locating position in which the jaws engage with the valve, or a part connected to the valve, in order to position the valve on the support plate 16. In respect of the pedestals 12 and 13, the arrangement of jaws comprise three equally spaced jaw blocks 27 (see FIG. 3) which are moveable radially inwardly and outwardly relative to the testing station along the guides 17 formed in the support plate 16. Each jaw block 27 includes an upstanding jaw 28 having a radially inwardly projecting head 29. As will be described in more detail below, the jaw blocks 27 are moveable in unison between the release position and the engaging position and, as they move to the engaging position, main body portions 30 (see FIG. 4) come into abutment with the valve body e.g. the annular flanged end which surrounds an inlet port of a valve, in order to centre the valve in position over the O-ring seals 23 and over the fluid test outlet 24. By operating in unison, the jaw blocks 27 are able to automatically position the valve correctly, even in the event of slight mispositioning in the initial placement of the valve.

The support plate 16 provides a flat polished surface which is readily able to mate in substantially sealed manner with the adjacent contact face of the valve placed thereon. In addition to centering the valve on the support plate 16, the jaw block arrangement is able to operate so as to hold-down the valve on the support plate 16 when it has been centrally positioned between the jaws. To this end, each of the heads 29 of the jaws 28 are able to move downwardly towards the support plate 16 so as firmly to clamp the valve in position thereon. When the valve has a radially projecting annular flange at one end, the head 29 is able to engage downwardly on a horizontal peripheral margin of the annular flange and thereby exert substantial downward pressure on the valve, to maintain a sealed connection between the valve and the support plate 16. As shown in FIG. 4, the engaging head 29 is normally biased upwardly by a compression spring 31 housed in a cylinder 32 and acting in an upwards direction on a lower projecting end 33 of jaw 28. This biasing locates the engaging head 29 above the edge of the annular flange as the jaw 28 advances along the guide 17 during the initial positioning of the valve by means of the jaws.

The engaging heads 29 are also operable in unison so as to exert simultaneous and equal downward pressure on the valve and, to this end, each jaw 28 has a pressure cylinder 34 having a piston therein (not shown in detail) attached to a connecting spindle 35 whereby, upon admission of pressure fluid to the cylinder 34, spindle 35 is moved downwardly and engaging head 29 is drawn downwardly into engagement with the valve. The pressure cylinder 34 and related parts comprise the power source to operate the jaws, and the preferred operating medium is hydraulic fluid which is derived from a supply provided within the upright support 19 of the pedestal. Thus, as shown in FIG. 4, an inlet 36 is provided in the base of the support 19, and a connecting passage 37 extends upwardly therefrom, and terminates in a pressure outlet 38 from which pressure is conveyed to the cylinder 34 by a line 39.

While the hold-down mode of the jaws is achieved under power, it is preferred that a simple manually operated arrangement is provided to move the jaw blocks 27 between the release position and the engaging position. To this end, as shown in more detail in FIGS. 3 and 4, a manually operated lever 40 is provided which is carried by an annular adjusting member 41. The adjusting member 41 is rotatably mounted on a fixed annular portion 42 of the support 19, and lever 40 has a spring loaded connection with the adjusting member 41.

Figure 3:
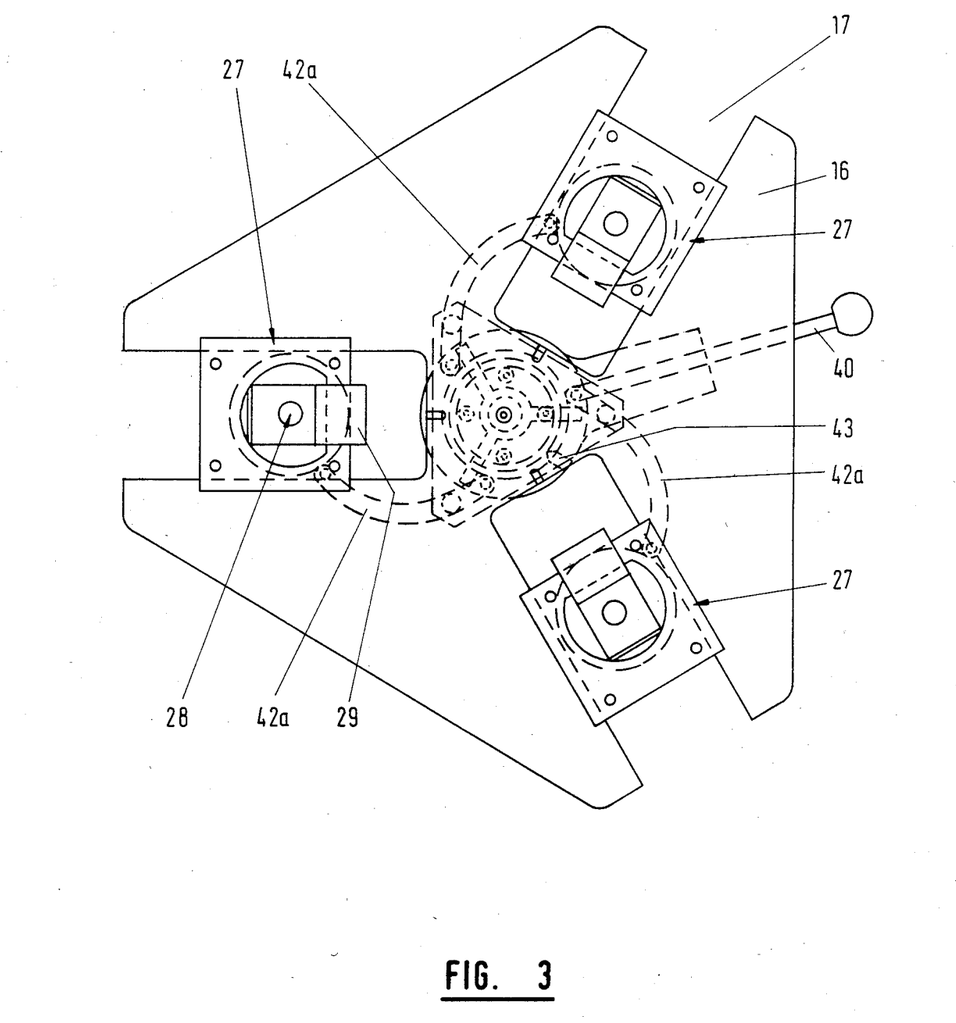
FIG. 3 is a plan view, to an enlarged scale, of a support table of a pedestal on which a flanged valve can be placed.

Each jaw block 27 is pivotally connected to adjusting member 41 by means of a respective toggle 42a and, evidently, angular movement of lever 40 will cause linear reciprocation, in unison, of the jaw blocks 27 along the respective guides 17. The arrangement may be such that movement of lever 40 through an arc of about 60° will be sufficient to move the jaw blocks 27 between the release and the engaging positions. However, if it should be desired for the jaw blocks 27 to have a greater path of travel between the release and the engaging positions, while still only pivoting the lever 40 through an arc of about 60°, there may be provided two circumferentially spaced slots in the periphery of the adjusting member 41, either of which can be engaged selectively by the spring loaded end of lever 40. The slots can be positioned about 60° apart from each other, one of these slots (the unoccupied slot) being shown by reference numeral 43 in FIG. 3. In the illustration of FIG. 3, the jaw blocks 27 are approximately mid-way in their path of travel between the release position and the engaging position, and further radial inward movement may be accomplished by withdrawing the spring loaded end of lever 40 from its particular slot in adjusting member 41, idly pivoting lever 40 in a clockwise direction until the spring loaded end can enter slot 43, and then pivoting lever 40 anticlockwise so as to complete the inward movement of the jaw blocks 27 until such time as they come into abutment with the valve.

The pedestals 12 and 13 are suitable for use with a valve having a plane faced end, but pedestal 14 may be used with a valve having a screwed end. Examples of such valve are screwed male or female safety relief valves. In order to mount such valves at the pedestal 14, there is provided a circular support plate 44 having a pair of diametrically opposed guide slots 45 along which are slideable a respective pair of jaws 46 (see FIG. 1). An adapter flange 47 (see FIG. 2a) is provided, having a suitable male or female threaded connection to mate with a respective male or female screwed end of a valve. As shown in FIG. 2a, the screwed male end 48 of a valve 49 is being received by a female thread 50 formed in adapter flange 47.

Figure 1:
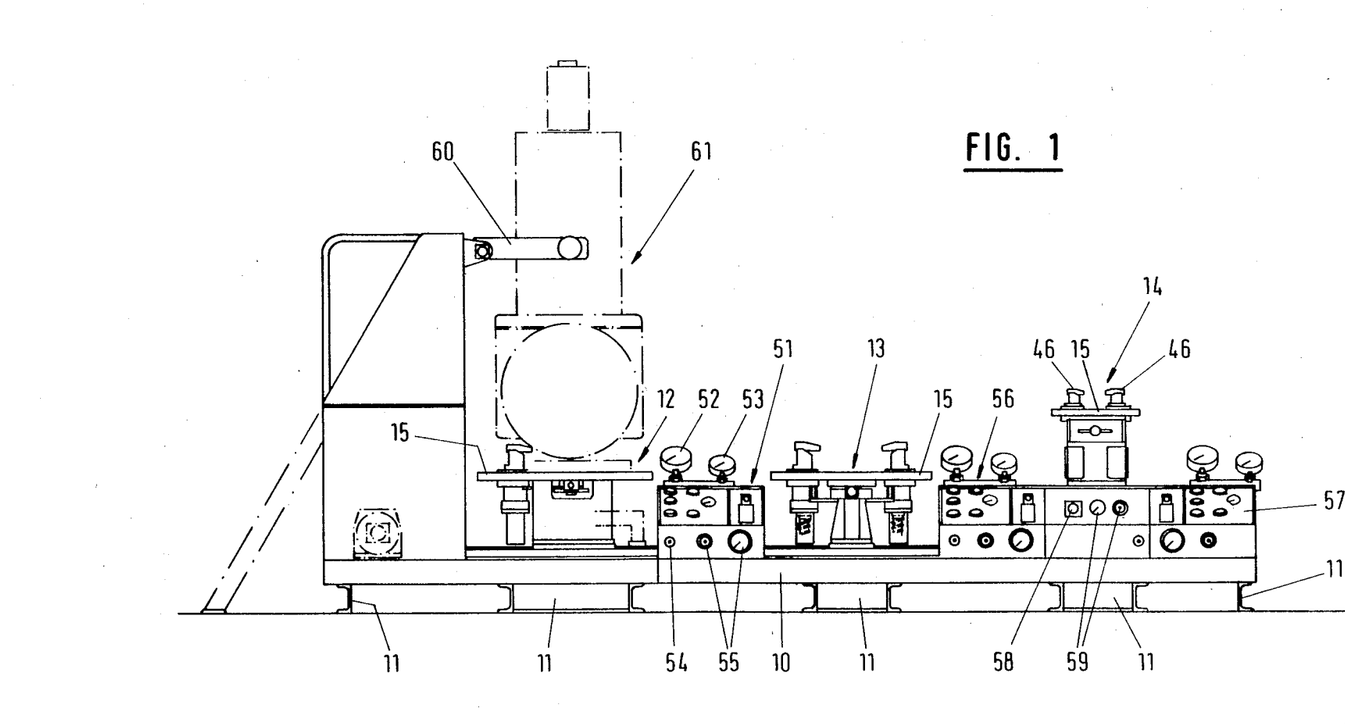
FIG. 1 is a side view of a three pedestal test stand.
Figure 2A:
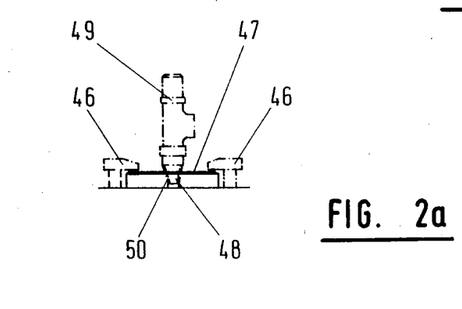
FIG. 2a is a detail view of an arrangement whereby a pedestal can be modified to receive the screwed end of a valve.

As shown in FIG. 1, each of the pedestals 12, 13 and 14 is provided with an associated control panel 51 bearing appropriate controls and instruments which enable automatic operation of the hold-down arrangements, and the supply and monitoring of test fluid media to the valves. Thus, pedestal 12 has a control panel 51 provided with a set pressure gauge 52, a back pressure test gauge 53, a snap-on connector 54 for a back pressure test hose, and a pressure regulator and hydraulic pressure gauge for the jaws 55. Pedestal 12 is provided with a similar control panel 56, whereas pedestal 14 has a control panel 57, and additionally a boost pump selector valve 58, and pressure regulator and gauge 59.

The automatically operating clamp or jaw pedestal test stand illustrated herein is designed to carry out assembly, set pressure, back pressure, and seat tightness test on valves, and especially safety relief valves with raised flange faces to meet specification ANSI B16.5, using compressed air. Additional flange specifications can also be accommodated. All of the support tables can be used simultaneously for valve testing, each being graded in size as shown on the attached Tables A, B and C, in respect of pedestals 12 to 14 respectively. The pedestals are able to test valves from ⅛ inch inlet minimum to 14 inch maximum.

The screwed adapter flanges are available for testing ⅛ inch up to 1 inch male or female screwed safety relief valves.

The pedestals 13 and 14 are designed to operate at a maximum of 10500 P.S.I.G., and pedestal 12 can operate at a maximum of 325 P.S.I.G. The tables at pedestals 13 and 14 are removable and interchangeable, to allow use of two of the types of table shown at pedestal 13, or two of the types shown at pedestal 14.

Figure 5A:
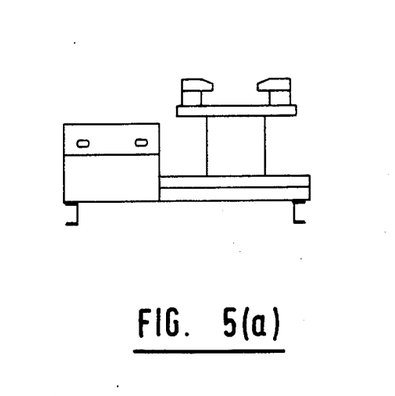
FIGS. 5a, b and c illustrate schematically single, double and triple pedestal test stands respectively.
Figure 5B:
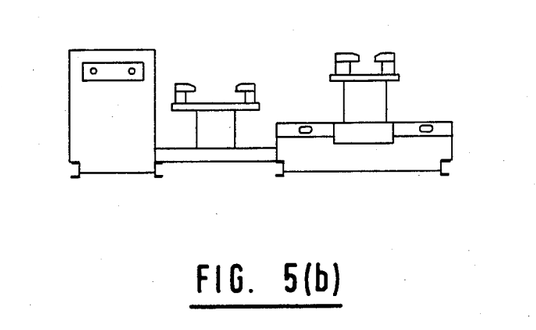
Figure 5C:
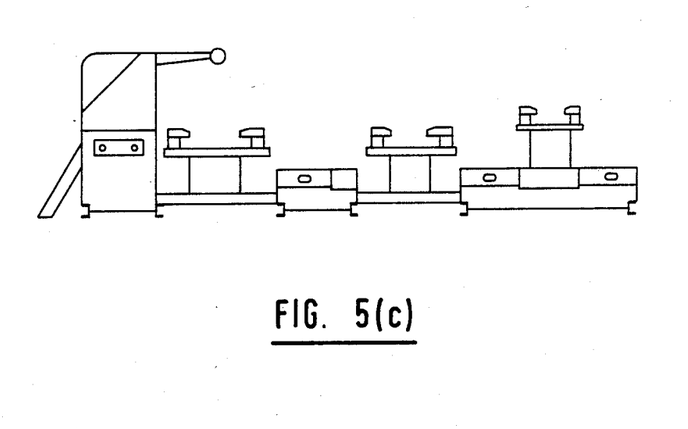

The main frame of the test stand can be adapted to suit one pedestal, two pedestals or three pedestals, (see FIGS. 5a–5c) and houses hydraulically operated pumps, which are operated by any suitable compressed air supply, and deliver hydraulic pressure via the pedestals and the lines 39 in order to operate the jaws. In addition, the main frame houses a booster pump, which may be used when a greater fluid testing pressure is required than is readily available, to be supplied via the pedestals and the passages 26 therein. The main frame also houses control valves and pipework.

The pedestal 12 is, as can be seen from the drawings, the largest of the pedestal stands, and has steps up to a working height platform, and provided with a swing-away steady clamp 60 which can be used for the assembly and testing of larger valves, such as the valve shown schematically at 61 in FIG. 1. A five inch ground clearance facilitates loading of valves onto the test stand when a mobile crane is used.

All of the tables provided at each pedestal are flash chrome plated steel to prevent rusting, carrying either two or three clamp units in machined slots. Each table has a single lever operation, to adjust the jaws or clamps from minimum to maximum flange diameters, and will centre each valve on the table. O-rings are fitted in machined grooves on each table, to seal the valve being tested. With other types of joint faces, a flat sealing gasket may be used, as required.

The jaws are hydraulically operated in the hold-down position, and are spring-returned, when pressure is released. Each set of table jaws or clamps are operated by an air driven hydraulic pump, maintaining a constant set pressure to a maximum of 3800 P.S.I. at 100 P.S.I. air supply pressure. Each set of clamps is controlled by a lever operated hydraulic valve. This valve has a safety interlock (not shown) which prevents manual release (inadvertently) of the clamps whilst the valve being tested is pressurised. The clamping pressure is variable, and controlled by a pressure regulator to the air driven hydraulic pump, and a pressure gauge indicates hydraulic pressure generated. The effective area of the tables at pedestals 12 and 13 is 5.3 square inches, and the effective area of table at pedestal 14 is 1.98 square inches.

In addition to compressed air testing of valves, the test stand can also be arranged for the hydrostatic and vacuum testing of valves using water or other selective fluid as test media.

Either simultaneous or selective pneumatic/hydrostatic vacuum testing may be performed.

The operating controls station adjacent to each table enables easy operation. Each panel consists of selector valves for low or high pressures, selector valves for set pressure and back pressure tests, and a single exhaust valve common to set pressure and back pressure valves. A pressure gauge in the panel indicates the air supply pressure available.

Master gauges, for set pressure and back pressure, are easily accessible for interchanging.

Controls for operating the booster pump for high pressure are easily accessible, on the front of the main frame.

TEST AIR SUPPLY

Three schemes are available, as follows:

Scheme 1—a single input of clean dry air at 125 P.S.I. is boosted to 600 P.S.I. for selection at the control panel. For higher pressures, a secondary booster pump will charge from 600 P.S.I. to a maximum of 10500 P.S.I.

Scheme 2—a single supply of clean dry air at 1200 P.S.I.G is used for pressure testing of valves with direct selection from the control panel. For higher pressures, a booster pump will charge from 1200 P.S.I.G to a maximum of 10500 P.S.I.G.

Scheme 3—to give a clean dry air supply to the required pressure and capacity to the test tables, a compressor unit complete with water cooler and refrigerator unit (not shown) may be supplied.

The unit will supply 2900 P.S.I for direct selection from a control panel. For higher pressures, a booster pump will charge from 2900 P.S.I.G to a maximum of 10500 P.S.I.G.

On all three above schemes, if testing is required using an inert gas, a facility may be provided to connect gas bottles into the test pressure system.

As possible additional equipment, there may be supplied back pressure/bubble leak test clamps, to facilitate testing of safety relief valves. Back pressure tests are required to ensure leak tight joints after assembly. The same clamp can also be used for checking valve seat tightness in accordance with API RP 527.

In addition to testing pressure relief type safety valves, the test stand can also be used for testing other sizes of valves such as, Gate, Globe and Check valves.

The test stand according to the invention provides an automated apparatus which is able to carry out quick and reliable clamping of a valve securely to a pedestal, and subsequent pressure testing of all items of the valve to be checked. This represents a significant improvement over existing equipment, in which a great deal of time is wasted on assembly and testing, in having to manually bolt the valve to the pedestal with gaskets, bolts and nuts etc. In addition, the test stand may be used as a convenient means for holding a valve during its manufacture, in which case a main valve housing will be clamped in position, the relevant parts fitted, pressure testing carried out, and then the assembled and tested valve removed ready for despatch to a customer.

While the test stands described above are particularly suitable for the pneumatic testing of valves, it should be understood that test stands according to the invention can be used for the pressure testing of valves with fluid pressure media other than compressed air, and including the testing of valves on liquid service. When liquid pressure testing is required, a self-circulating liquid supply arrangement (not shown) may be provided to deliver and to remove pressure liquid relative to the interior of a valve to be tested.

Figure 6:
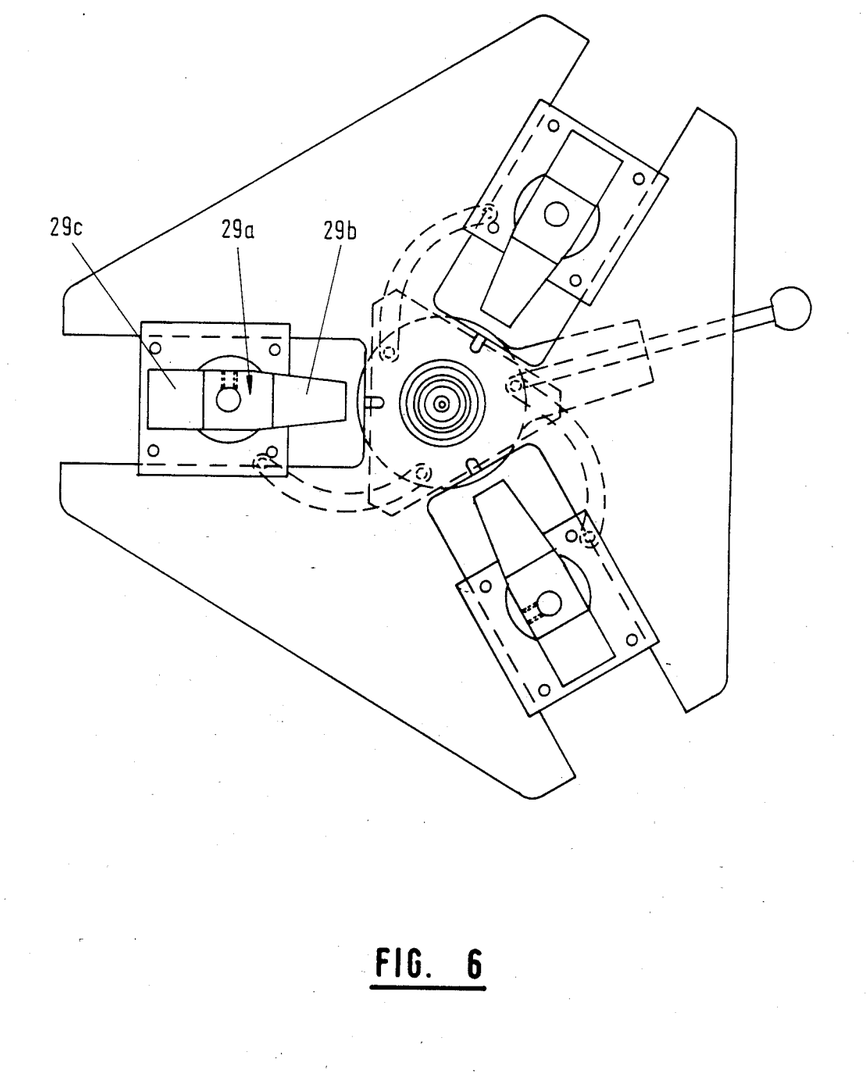
FIG. 6 is a plan view of a modified construction of support table.
Figure 7:
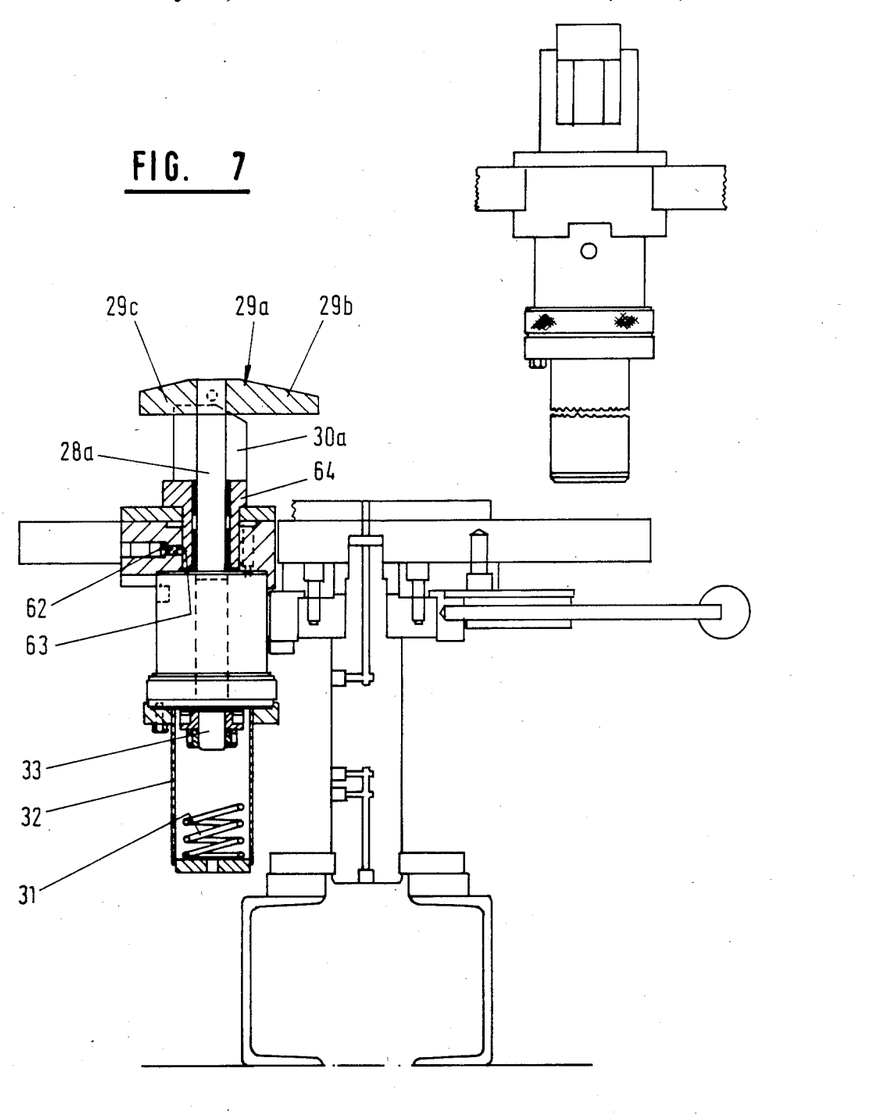
FIG. 7 is a vertical sectional view, showing in more detail an alternative construction of clamping jaw used on the support table shown in FIG. 6.

A further alternative construction of clamping jaw arrangement is shown in FIGS. 6 and 7, which increases the range of valve sizes which can be tested on a single support plate of a test stand. In the embodiments so far described, with reference to FIGS. 1 to 5, there are providing clamping jaw arrangements (27 to 29) having non-rotatable clamping heads (29).

With a view to increasing the range of valve body sizes which can be pressure-tested on a test stand, pivotable heads (29a) are provided, as shown in FIGS. 6 and 7. Each head (29a) and its body portion (30a) are jointly pivotable about a vertical axis through 180° between a first holding position (as shown in FIGS. 6 and 7) in which a long lug portion (29b) of the head (29a) extends radially inwardly with respect to the centre of the support table, and a second position in which a shorter lug portion (29c) of the head extends radially inwardly. Evidently, the lug portions (29b) and (29c) are angularly spaced from each other by 180°, and the respective jaw is pivotable between the first and second holding positions in each of which a respective one of the lug portions is presented for engagement with the valve.

The test stand can be used with the heads (29a) in the first holding position, when small valves are to be tested, whereby the long lugs (29b) are able to extend over, and hold down the small valve bodies satisfactorily. However, if larger valves are to be tested, then each head is pivoted through 180° to the second holding position, in which the shorter lug portions (29c) are able to extend over and hold down larger valve bodies satisfactorily.

A spring loaded detent (62) is engageable in either one of two diametrically opposed recesses (63) in the wall of a pivotable sleeve (64) in which the body (30a) and jaw (28a) are mounted for rotation therewith.

When a particularly large valve is to be tested, this can be fitted on the support table quite satisfactorily, even if there is initially insufficient clearance between the inner edges of the lugs 29c (which have been pivoted inwardly to the second position) and the valve. To mount the valve on the support table, given such a situation, each head is pivoted through approximately 90° to an intermediate position between the first and second positions, in which case the lugs (29b and 29c) will extend substantially tangentially, and thereby provide increased space through which the valve can be lowered onto the support table. The heads are then pivoted to the second position, with the lugs (29c) overlying the flange of the valve body, prior to necessary radial inward and downward movement of the jaws relative to the valve body.

By modifying the construction of support table, in the manner described above with reference to FIGS. 6 and 7, it is possible for a single testing station to accomodate valve bodies in a wider range than possible with the previously described embodiments. Thus, with the arrangement of FIGS. 6 and 7, it is possible to test valves in the range ½ inch up to 10 inches.

I claim:

1. A test stand for the pressure testing of a valve which comprises:
   a flat support defining a valve testing station onto which a port of a valve can be placed;
   means provided in said support for directing a test fluid pressure medium into said port when the valve is placed on the support;
   a set of jaws uniformly spaced around the testing station, each jaw being mounted for slideable movement along a respective radial guide;
   means for applying joint movement to the jaws along the respective guides between a release position in which a valve can be placed on, or removed from the testing station, and a locating position in which the jaws engage with the valve, or a part connected to the valve, in order to centralize the valve between the jaws on the testing station;
   a respective operating cylinder coupled with each jaw and movable therewith during joint movement of the jaws along the guides, each cylinder being operable to move the respective jaw in a direction towards the support in a valve hold-down mode of the test stand; and
   means operable, in the hold-down mode, to supply fluid energy simultaneously to all of the operating cylinders, when the jaws are in said locating position, so that the jaws hold-down the valve on the testing station prior to pressure testing of the valve.

2. A test stand according to claim 1, in which the flat support comprises a table which is mounted on a base plate by means of a pedestal which is rigidly mounted on the base plate.

3. A test stand according to claim 2, including a plurality of valve testing stations, each testing station being provided by a respective table mounted on said base plate via a respective pedestal.

4. A test stand according to claim 3, in which the tables and related parts of the testing stations are interchangeable.

5. A test stand according to claim 4, in which each pedestal includes means for conveying test fluid pressure medium to the respective testing station.

6. A test stand according to claim 5, in which said conveying means comprises a fluid medium input, and a passage leading from said input to a fluid medium outlet provided in said table.

7. A test stand according to claim 2, in which the pedestal includes supply means for conveying a supply of fluid energy to operate the set of jaws.

8. A test stand according to claim 7, including spring-loading which urges each jaw in a direction away from the table, the respective operating cylinder being operable to move each jaw against its spring-loading in the hold-down mode of the jaws.

9. A test stand according to claim 1 and adapted for testing a valve having a flanged end, in which the jaws have head portions which project generally inwardly towards the testing station and which serve in use to engage and to press downwardly upon a flat upper surface of the flanged end of a valve in the hold-down mode of the test stand.

10. A test stand according to claim 1 and adapted for testing a screwed male or female valve, including an adapter plate having means for mounted a screwed valve thereon and adapted to be mounted on said support by the jaws.

11. A test stand according to claim 1, including a pressure supply system coupled with the test stand for supplying test fluid pressure medium to the testing station and for supplying fluid pressure operating medium to operate the test stand.

12. A test stand according to claim 11, including a pressure boost system built-into the test stand to permit pressure testing to be carried out at pressures greater than the supply pressure which is available.

13. A test stand according to claim 1, in which each jaw has a pair of angularly spaced projecting lugs for engaging a valve to be tested, and the jaw is mounted on the support for pivotable movement about a substantially vertical axis between first and second valve-locating positions in which a respective one of said lugs is presented for engagement with the valve to be tested.

14. A test stand according to claim 1, including a manually operated lever arrangement at the testing station for moving the jaws in unison along their respective guides for the purposes of centering the valve between the jaws.

* * * * *